United States Patent
Barwicz et al.

(10) Patent No.: US 8,724,937 B2
(45) Date of Patent: May 13, 2014

(54) FIBER TO WAFER INTERFACE

(75) Inventors: Tymon Barwicz, Yorktown Heights, NY (US); Darrell R. Childers, Hickory, NC (US); Dan Kurtz, Huntersville, NC (US)

(73) Assignees: International Business Machines Corporation, Armonk, NY (US); US Conec, Ltd., Hickory, NC (US)

( * ) Notice: Subject to any disclaimer, the term of this patent is extended or adjusted under 35 U.S.C. 154(b) by 222 days.

(21) Appl. No.: 13/331,164

(22) Filed: Dec. 20, 2011

(65) Prior Publication Data

US 2013/0156365 A1    Jun. 20, 2013

(51) Int. Cl.
G02B 6/12    (2006.01)

(52) U.S. Cl.
USPC .......................................................... 385/14

(58) Field of Classification Search
None
See application file for complete search history.

(56) References Cited

U.S. PATENT DOCUMENTS

| | | | |
|---|---|---|---|
| 5,343,544 A | 8/1994 | Boyd et al. | |
| 5,499,312 A | 3/1996 | Hahn et al. | |
| 5,625,730 A * | 4/1997 | Ishikawa et al. | 385/49 |
| 6,157,759 A | 12/2000 | Seo et al. | |
| 6,415,082 B1 | 7/2002 | Wach | |
| 6,470,117 B1 | 10/2002 | Tang et al. | |
| 6,741,776 B2 * | 5/2004 | Iwashita et al. | 385/49 |
| 6,860,642 B2 | 3/2005 | Vodrahalli et al. | |
| 6,976,792 B1 | 12/2005 | Cohen et al. | |
| 7,223,025 B2 | 5/2007 | Benzoni et al. | |
| 7,292,756 B2 * | 11/2007 | Moynihan et al. | 385/49 |
| 7,454,098 B1 | 11/2008 | Lamprecht et al. | |
| 7,477,813 B2 * | 1/2009 | Monma et al. | 385/16 |
| 7,492,995 B2 * | 2/2009 | Kuroda et al. | 385/49 |
| 7,729,581 B2 | 6/2010 | Rolston et al. | |
| 7,738,753 B2 | 6/2010 | Assefa et al. | |
| 8,320,721 B2 * | 11/2012 | Cevini et al. | 385/28 |
| 8,534,927 B1 * | 9/2013 | Barwicz et al. | 385/60 |
| 2002/0106165 A1 | 8/2002 | Arsenault et al. | |
| 2002/0181877 A1 * | 12/2002 | Van Eck | 385/49 |
| 2002/0181882 A1 | 12/2002 | Hibbs-Brenner et al. | |
| 2003/0007754 A1 * | 1/2003 | Terashima | 385/92 |
| 2004/0022487 A1 | 2/2004 | Nagasaka et al. | |
| 2004/0028314 A1 | 2/2004 | Lee et al. | |

(Continued)

FOREIGN PATENT DOCUMENTS

| | | |
|---|---|---|
| CN | 101702048 A | 5/2010 |
| CN | 102084277 A | 6/2011 |

(Continued)

OTHER PUBLICATIONS

B. G. Lee et al., "20-um-Pitch Eight-Channel Monolithic Fiber Array Coupling 160 Gb/s/Channel to Silicon Nanophotonic Chip," 2010 Conference on Optical Fiber Communication (OFC), collocated National Fiber Optic Engineers Conference, (OFC/NFOEC), Mar. 21-25, 2010, paper PDPA4, 3 pages.
B. L. Booth et al., "Polyguide(tm) Polymeric Technology for Optical Interconnect Circuits and Components," Proc. SPIE, vol. 3005, 1997, pp. 238-251.
Barwicz, et al., "Fiber to Wafer Interface," U.S. Appl. No. 13/331,164, filed Dec. 12, 2011; not yet published.

(Continued)

*Primary Examiner* — Sung Pak
(74) *Attorney, Agent, or Firm* — Cantor Colburn LLP; Vazken Alexanian

(57) ABSTRACT

An interface device includes a body portion having a single-mode waveguide portion including a substantially optically transparent material, a cladding portion defined by channels contacting the waveguide portion, the cladding portion including a substantially optically transparent polymer material, an engagement feature operative to engage a portion of a wafer, and a guide portion operative to engage a portion of an optical fiber ferrule.

25 Claims, 10 Drawing Sheets

(56) References Cited

U.S. PATENT DOCUMENTS

| | | |
|---|---|---|
| 2005/0163416 A1 | 7/2005 | Yamada et al. |
| 2005/0238290 A1* | 10/2005 | Choudhury et al. ............ 385/59 |
| 2008/0075408 A1 | 3/2008 | Cho et al. |
| 2008/0253423 A1 | 10/2008 | Kopp |
| 2009/0110354 A1 | 4/2009 | Sutherland |
| 2009/0226130 A1 | 9/2009 | Doany et al. |
| 2010/0061683 A1 | 3/2010 | Sasaki |
| 2012/0020621 A1 | 1/2012 | Zhou |
| 2012/0207426 A1 | 8/2012 | Doany et al. |

FOREIGN PATENT DOCUMENTS

| | | |
|---|---|---|
| JP | 5063419 A | 3/1993 |
| JP | 2005189730 A | 7/2005 |
| JP | 2007333982 A | 12/2007 |
| JP | 2012137538 A | 7/2012 |
| KR | 2020090001169 U | 2/2009 |

OTHER PUBLICATIONS

Barwicz et al. "Flexible Fiber to Wafer Itnerface," U.S. Appl. No. 13/428,277, filed Mar. 23, 2012, not yet published.

Booth et al., "Polyguide(tm) Polymeric Technology for Optical Interconnect Circuits and Components," Proc. SPIE, vol. 3005, 1997, pp. 238-251.

Kumar et al., "Birefringence of optical fiber pressed into a V groove," Optics Letters, Dec. 1981, vol. 6, Issue 12, 1981, pp. 644-646.

Lee et al., "20-um-Pitch Eight-Channel Monolithic Fiber Array Coupling 160 Gb/s/Channel to Silicon Nanophotonic Chip," 2010 Conference on Optical Fiber Communication (OFC), collocated National Fiber Optic Engineers Conference, (OFC/NFOEC), Mar. 21-25, 2010, paper PDPA4, 3 pages.

Thacker et al., "Flip-Chip Integrated Silicon Photonic Bridge Chips for Sub-Picojoule Per Bit Optical Links", Proceedings 60th Electronic Compoennts and Technology Conference (ECTC), Jun. 1-4, 2010, pp. 240-243.

Wang et al., "Ge-photodetectors for Si-Based Optelectronic Integration", Sensors, vol. 11, No. 1, 2011, pp. 696-718.

* cited by examiner

FIBER TO WAFER INTERFACE

FIELD OF INVENTION

The present invention relates generally to optical signal connection devices, and more specifically, to interfaces between optical fibers and devices arranged on wafers.

DESCRIPTION OF RELATED ART

Optical signals may be transmitted via optical fibers. It is often desirable to connect the optical fibers to devices such as, for example, wave guides or signal processing features that may be arranged on a wafer such as, for example, a semiconductive wafer. Previous methods and devices for connecting optical devices to devices on wafers are often inefficient and costly to manufacture.

BRIEF SUMMARY

According to one embodiment of the present invention, an interface device includes a body portion having a single-mode waveguide portion including a substantially optically transparent material, a cladding portion defined by channels contacting the waveguide portion, the cladding portion including a substantially optically transparent polymer material, an engagement feature operative to engage a portion of a wafer, and a guide portion operative to engage a portion of an optical fiber ferrule.

According to another embodiment of the present invention a fiber to wafer interface system includes an interface device having a polymer material, a single-mode waveguide portion including a substantially optically transparent material, a cladding portion contacting the waveguide portion, the cladding portion including a substantially optically transparent polymer material, and a guide portion operative to engage a portion of an optical fiber ferrule, a wafer portion comprising a single mode waveguide portion arranged on a portion of the wafer, and an adhesive disposed between a portion of the single mode waveguide portion of the body portion and the single mode waveguide portion of the wafer portion, the adhesive securing the body portion to the wafer portion.

According to another embodiment of the present invention an interface device includes a body portion having a single-mode waveguide portion including a substantially optically transparent material, a cladding portion defined by channels contacting the waveguide portion, the cladding portion including a substantially optically transparent polymer material, an engagement feature operative to engage a portion of a wafer, and a guide portion operative to engage a portion of an optical fiber ferrule.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Previous interfaces between optical fiber and devices arranged on wafers were costly to manufacture. The methods and devices described below offer an economic interface for connecting optical fiber to devices arranged on wafers. In this regard, a wafer may include any type of substrate having a substantially planar surface. The wafer may include any type of suitable material or combination of materials including, for example, silicon (Si), germanium (Ge), gallium (Ga), arsenic (As), indium (In), or phosphorous (P). Any type of devices or combinations of devices may be fabricated on a wafer such as, for example, optical features, optical wave guides, mechanical features, or electronic features.

Figure 1:
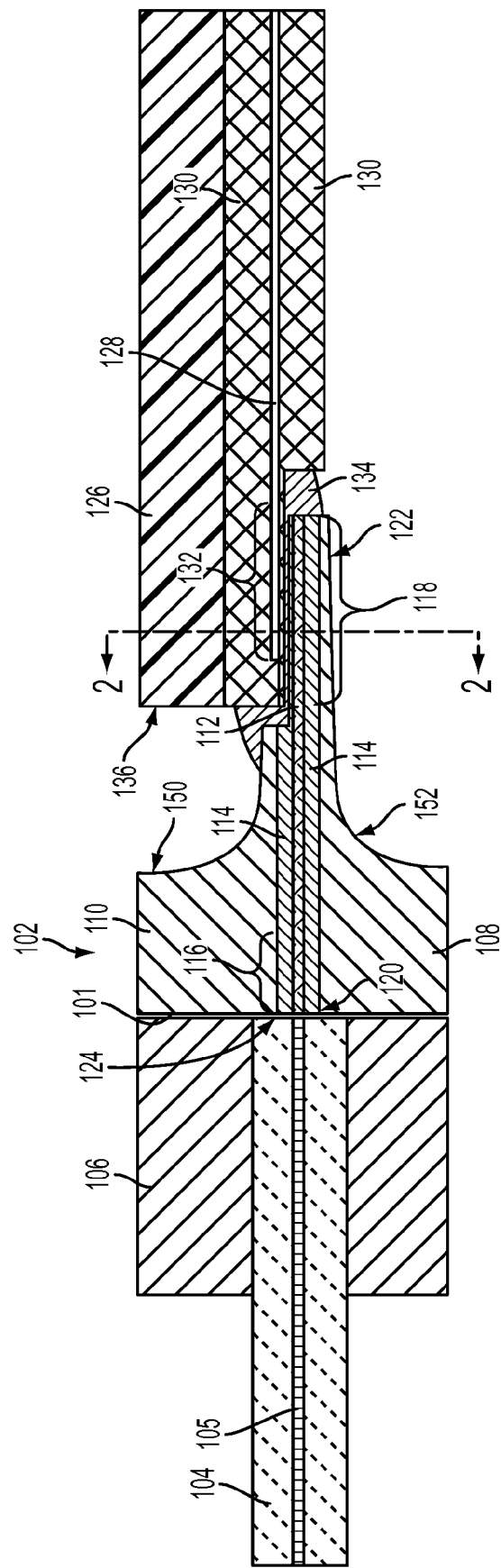
FIG. 1 illustrates a side cut-away view of an exemplary embodiment of an interface device.

FIG. 1 illustrates a side cut-away view of an exemplary embodiment of an interface device 102. The interface device 102 is secured proximate to optical fiber(s) 104 that is arranged in an optical fiber ferrule 106. The optical fiber ferrule 106 is operative to secure at least one optical fiber 104, and in the illustrated embodiment, the optical fiber ferrule 106 secures a plurality of optical fibers 104. The optical fibers 104 of the illustrated embodiment may be formed from, for example doped silica glass and/or polymer material. The optical fibers may be cylindrical in shape and are designed to guide single-mode optical signals. In the illustrated embodiment, the diameter of the optical fibers 104 is between approximately 40 to 130 microns (μm), or 80, 90, or 125 μm. The core 105 of the optical fiber has a diameter between 2 and 15 μm, or between 8 and 11 μm. The optical fiber ferrule 106 secures the optical fibers 104 in an arrangement where the optical fibers 104 are spaced approximately between 100 and 500 μm between each other, or approximately 250 μm in a substantially coplanar arrangement at the distal end 101 of the optical fiber ferrule 106.

The optical fiber ferrule 106 may be aligned and secured to the interface device 102 with, for example, an arrangement of pins, fasteners, or clips (described below). An example of an optical fiber ferrule is an MT ferrule using metal guide pins. The ferrule may contain between 1 and 48 fibers, or 8 or 12 fibers. The interface device 102 of the illustrated embodiment includes a body portion 108, a cap portion 110, and a waveguide portion 112 disposed between the body portion 108 and the cap portion 110. The waveguide portion 112 is surrounded by a cladding portion(s) 114. The cladding portion 114 is substantially transparent to the optical signals and may include a polymer material. The optical loss through the cladding portion 114 material is less than 20 decibels per centimeter (dB/cm), or less than approximately 5 dB/cm or 3 dB/cm for the wavelength range of the optical signals (for example, between 950 and 1650 nanometers (nm), or for a 60 nm wide wavelength spectrum located between 950 and 1650 nanometers (nm)). The waveguide portion 112 is a single-mode waveguide having rectangular, rib, ridge, strip, or wire geometry having a width between approximately 100 nm to 30 µm, and a height between approximately 100 nm to 15 µm. The waveguide portion 112 is formed from a substantially transparent material such as, for example, a polymer material having a propagation loss that is less than 20 dB/cm, or less than approximately 5 dB/cm or 3 dB/cm for the wavelength range of the optical signals.

In the illustrated embodiment, the cladding portion 114 may be fabricated from a material that is different from the material used to fabricate the body portion 108 a cap portion 110, or in alternate embodiments the materials may be the same material. In this regard, cladding portion 114 may be integrally formed with the body portion 108 and/or the cap portion 110. In the illustrated embodiment, the waveguide portion 112 includes a first optical mode converter portion 116 and a second optical mode converter portion 118 arranged at a first distal end 120 and a second distal end 122, respectively, of the waveguide portion 112. In one embodiment, the thickness of the cladding region 114 separating the waveguide 112 from the adhesive 134 may be reduced near 118 to be between 0 and 5 µm, or between 0 and 1 µm. In another embodiment, the cap portion 110 may be integrally formed with the body portion 108 and may be formed from a single material. In another embodiment, the cap and the body may be formed from any number of components that are connected, joined, or bonded together.

In the illustrated embodiment, the first optical mode converter portion 116 is sized and shaped to provide a butt-coupling arrangement between the distal ends 124 of the optical fiber(s) 104 and the first distal end 120 of the waveguide portion 112 that matches the mode profile(s) of the optical fiber(s) 104. The butt-coupling arrangement illustrated is perpendicular to the axis of the fiber. Alternatively, the butt-coupling may be at an angle less than 90 degrees to reduce the light reflections at the interface. The angle may be between 75 and 90 degrees, or 82 degrees to reduce reflections.

The interface device 102 is secured to a wafer 126. The wafer 126 of the illustrated embodiment includes a single-mode waveguide portion 128 arranged on the wafer 126. The waveguide portion 128 may include any number of waveguides having, for example, a rectangular, rib, ridge, strip, or wire geometry. The waveguide portion 128 includes a substantially transparent material such as, for example, Si, SiC, SiGe, SiON, $SiO_2$, SiCN, GaAs, InP, InGaAsP, or GaN. The width of the waveguides in the waveguide portion 128 is approximately 10 nm-30 µm, while the height of the waveguides in the waveguide portion is approximately 10 nm-12 µm. The propagation loss of the material is less than 20 dB/cm for the wavelength range of the optical signals. The waveguide portion 128 is surrounded by cladding portion(s) 130 that is substantially transparent to the optical signals. The cladding portion 130 may be formed from a material such as, for example, Si, SiC, SiGe, SiON, $SiO_2$, SiCN, GaAs, InP, InGaAsP, or GaN. In the illustrated embodiment the cladding portions 130 have a thickness of approximately 1-15 µm. The waveguide portion 128 includes an optical mode converter portion 132. In one embodiment, the thickness of the cladding region 130 separating the waveguide 128 from the adhesive 134 may be reduced near the optical mode converter portion 132 to be between 0 and 5 µm, or between 0 and 1 µm.

The interface device 102 is secured to the wafer 126 with an adhesive 134. In the illustrated embodiment, the adhesive 134 includes, for example, an optically transparent epoxy that may be applied as a liquid and cured with an ultra violet light; however any suitable adhesive may be used to secure the interface device 102 to the wafer 126. The adhesive 134 provides an optical loss for a plane wave propagating through the material of less than 30 dB/cm or less than 10 dB/cm or 5 dB/cm for the wavelength range of the optical signals. The optical mode converter portion 118 of the interface device 102 overlaps with, and is aligned and arranged proximate to the optical mode converter portion 132 arranged on the wafer 126. In the illustrated embodiment, the waveguide portions 112 and 128 are arranged to provide adiabatic coupling in the optical mode converter portions 118 and 132 and include corresponding tapered profiles (e.g., the width of the optical mode converter portion 118 portion tapers towards the distal end 122 while the width of the optical mode converter portion 132 may taper towards the edge 136 of the wafer 126). In this regard one of the two waveguide portion 112 and 128 may include the tapered profile, while the corresponding waveguide portion may not include a tapered profile. For example, the optical mode converter portion 132 arranged on the wafer 126 may include a tapered profile while the optical mode converter portion 118 of the interface device 102 may not include a tapered profile. In an alternate exemplary embodiment, the waveguide portions 112 and 128 may be arranged to provide butt-coupling where the optical mode converter portion 118 on the interface device 102 matches the mode profile of the optical mode converter portion 132 on the wafer 126.

Figure 2:
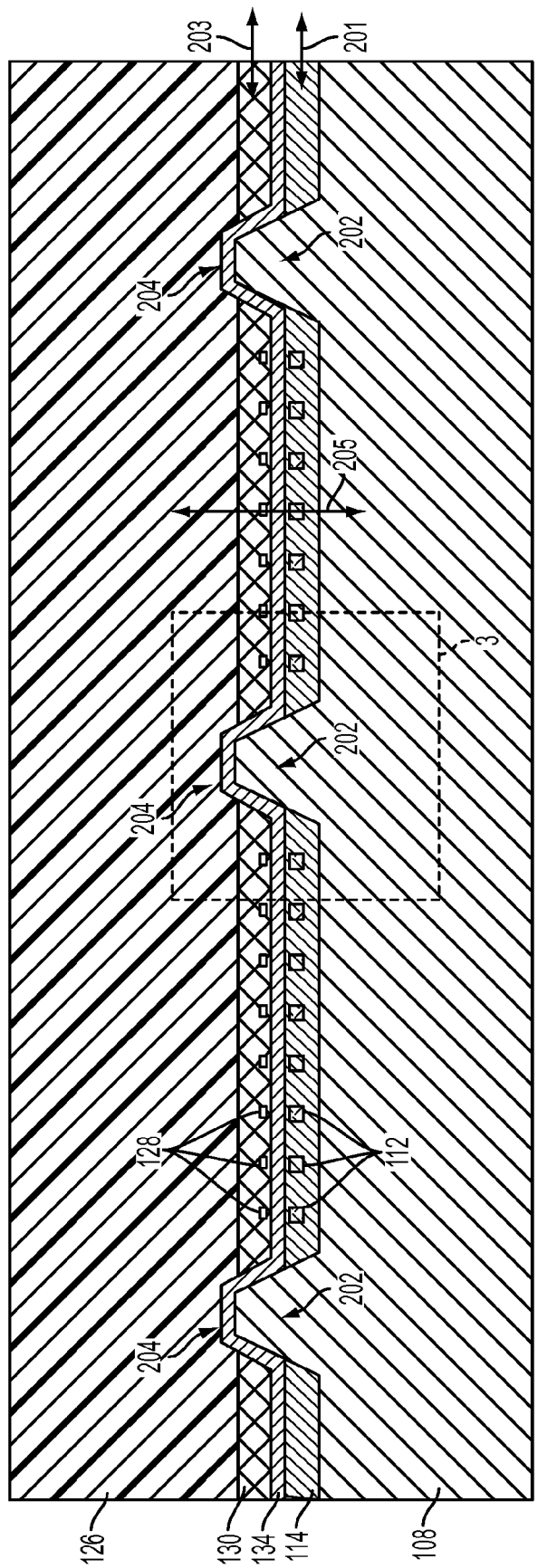
FIG. 2 illustrates a cut-away view along the line 2 of FIG. 1.

FIG. 2 illustrates a cut-away view along the line 2 (of FIG. 1). The arrangement of the overlapping waveguide portions 112 and 128 is shown where the waveguide portions 112 and 128 are arranged in pairs. The longitudinal axes of the waveguide portions 112 are arranged substantially in parallel and coplanar to each other, while the longitudinal axes of the waveguide portions 128 are also arranged substantially in parallel and coplanar to each other. The plane 201 defined by the longitudinal axes of the waveguide portions 112 and the plane 203 defined by the longitudinal axes of the waveguide portions 128 are arranged substantially in parallel to each other. Each of the waveguide portions 112 and 128 in a pair are aligned such that their longitudinal axes are substantially coplanar, defining a plane 205 substantially perpendicular to the planes 201 and 203.

Figure 3:
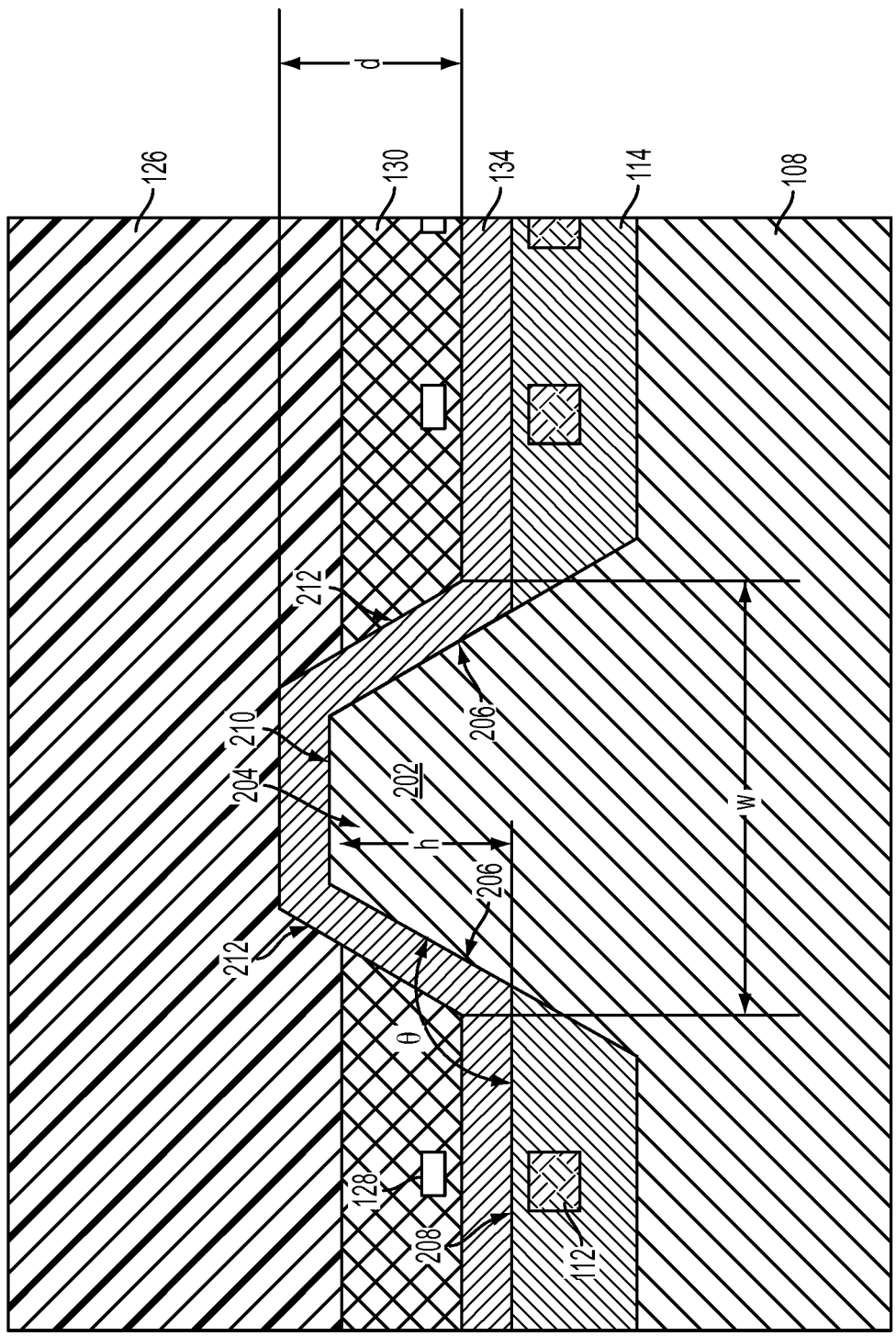
FIG. 3 illustrates an expanded view of the region 3 of FIG. 2.

In the illustrated embodiment, engagement features 202 are arranged on the body portion 108. FIG. 3 illustrates an expanded view of the region 3 (of FIG. 2). The wafer 126 includes corresponding engagement features 204 that may include, for example, recesses or channels that are engaged by the engagement features 202. The channels 204 may be defined by the wafer 126 and/or the cladding portion 130. In the illustrated embodiment, the engagement features 202 extend from the planar surface 208 of the body portion 108, and include sloped sidewalls 206 that define an oblique angle (A) that may range from approximately 20° to 70° relative to the substantially planar surface 208 of the body portion 108; or an angle of approximately 55°. Though the sidewalls 206 of the illustrated embodiment define an oblique angle, in alternate embodiments, the sidewalls 206 may define, for example, a substantially right angle. In some embodiments one of the sidewalls 206 may define a substantially right angle, while the opposing sidewall 206 may define an oblique angle. The surface 210 of the engagement features 202 and the surface 208 define a height (h) of approximately 1-100 μm, while the depth (d) of the channels 204 ranges from approximately 1-100 μm, or 10-30 μm. The width (w) of the channels 204 is approximately 50-1000 μm, or 100-500 μm, or 150-300 μm. The arrangement of the engagement features 202 and the corresponding channels 204 provides for precise alignment of the body portion 108 with the wafer 126 such that the waveguide portions 112 and 128 are arranged and substantially aligned as discussed above. The sloped sidewalls 206 of the engagement features 202 and the corresponding sloped sidewalls 212 of the channels 204 allow the body portion 108 to be more easily aligned with the wafer 126. The adhesive 134 disposed between the wafer 126 and the body portion 108 secures the interface device 102 and the wafer 126 together. Though the illustrated embodiment includes the adhesive 134 arranged between the engagement features 202 and the adhesive may be applied in other areas along planar surface 208. Though the illustrated exemplary embodiment includes three engagement features 202, alternate embodiments may include any number of engagement features 202.

Figure 4:
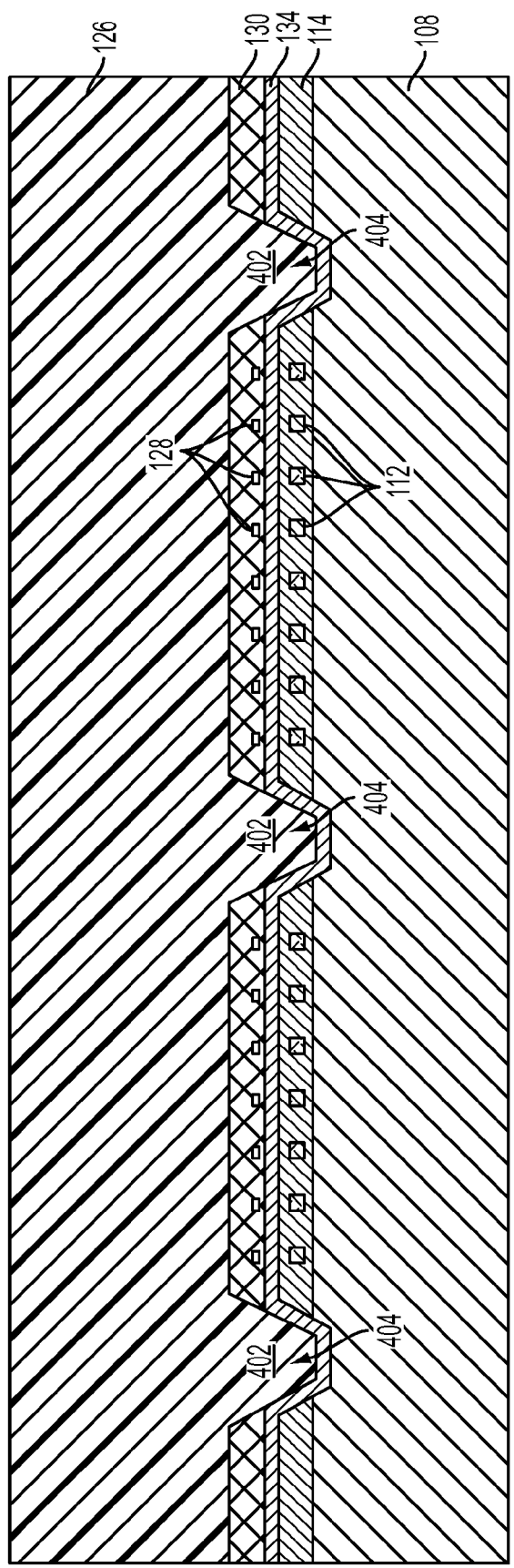
FIG. 4 illustrates a cut-away view along the line 2 of FIG. 1.

FIG. 4 illustrates a cut-away view along the line 2 (of FIG. 1) for an alternate exemplary embodiment of the interface device 102 and the wafer 126 that is similar to the embodiment described above in FIGS. 2 and 3. In this regard, engagement features 402 are arranged on the wafer 126, and corresponding channels 404 are arranged on the body portion 108.

Figure 5:
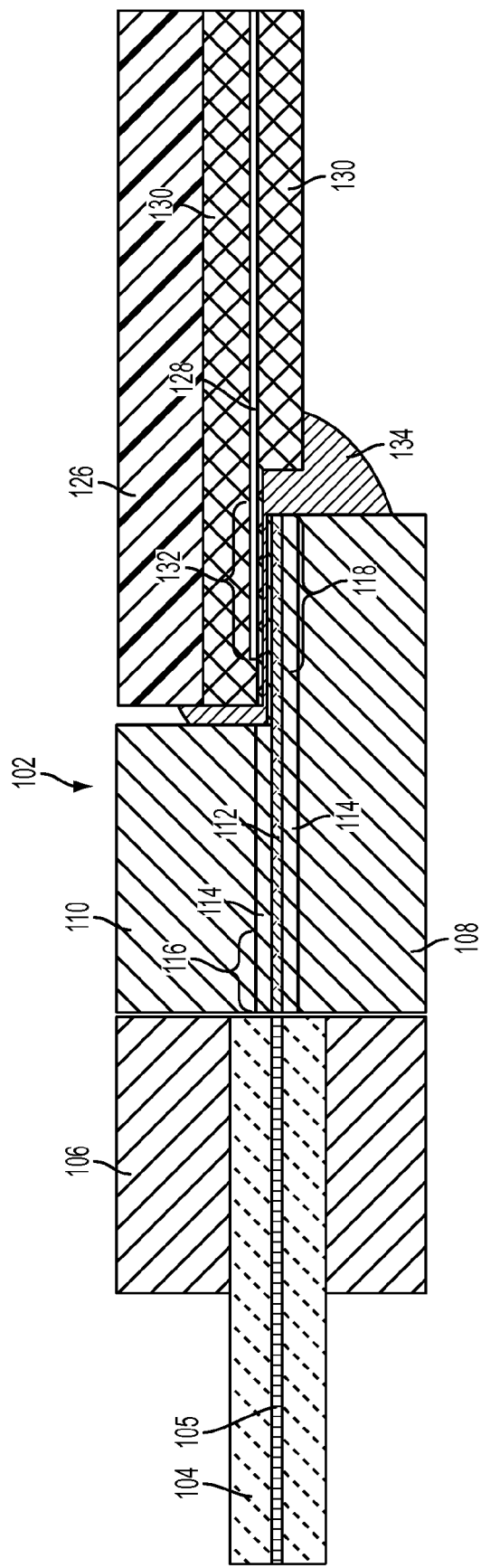
FIG. 5 illustrates a side cut-away view of an alternate embodiment of the interface device.

FIG. 5 illustrates a side cut-away view of an alternate embodiment of the interface device 102. The interface device 102 of the illustrated embodiment is similar to the embodiments described above. However, the illustrated embodiment includes a cladding portion(s) 114 that is integrally formed from the same material as the body portion 108 and/or the cap portion 110. The profile of the cap portion 110 and the body portion 108 include an alternate profile where in the illustrated embodiment the cap portion 110 and the body portion 108 do not include the sloped profiled surfaces 150 and 152 (of FIG. 1). Though the illustrated embodiment includes a cladding portion(s) 114 that is formed from the same material as the body portion 108, alternate embodiments may include a cladding portion(s) 114 that is formed from a different material than the body portion 108 in a similar manner as described above in FIG. 1. Likewise, as discussed above, the illustrated embodiment of FIG. 1 may include a cladding portion(s) 104 that is integrally formed from the same material as the body portion 108 and/or the cap portion 110 as shown in FIG. 5.

Figure 6:
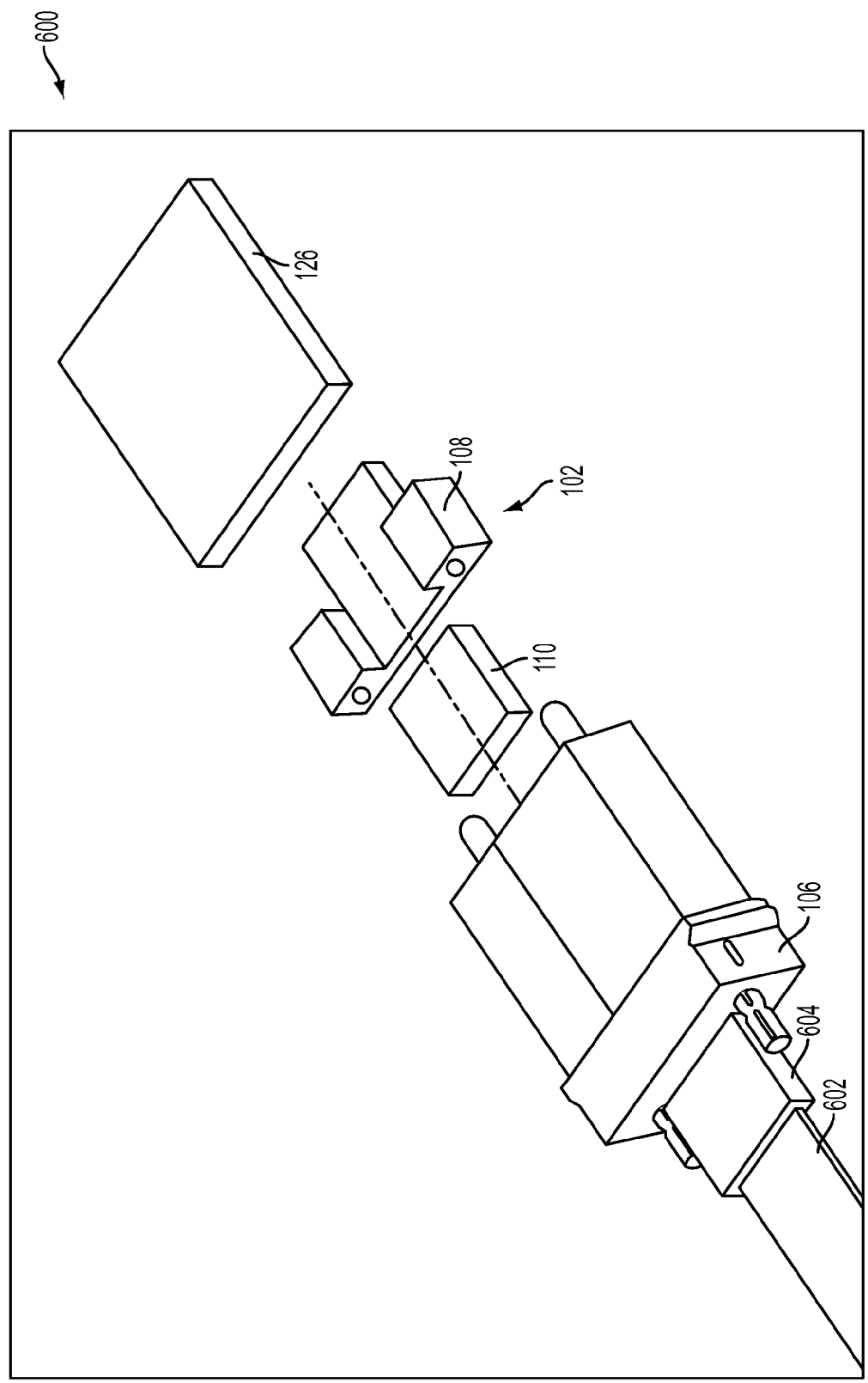
FIG. 6 illustrates a perspective exploded view of an alternate exemplary embodiment of a fiber to wafer interface system.

FIG. 6 illustrates a perspective exploded view of an alternate exemplary embodiment of a fiber to wafer interface system 600. The system 600 includes an optical ribbon fiber portion 602, a ferrule boot portion 604, an optical fiber ferrule 106, a wafer 126 and an interface device 102. The interface device 102 includes the cap portion 110 and the body portion 108. In the illustrated embodiment, the optical fiber ferrule 106 is a MT type optical fiber ferrule that secures and arranges a plurality of optical fibers. However, alternate embodiments of the interface device 102 may be sized and shaped to engage other types of optical fiber ferrules accordingly.

Figure 7:
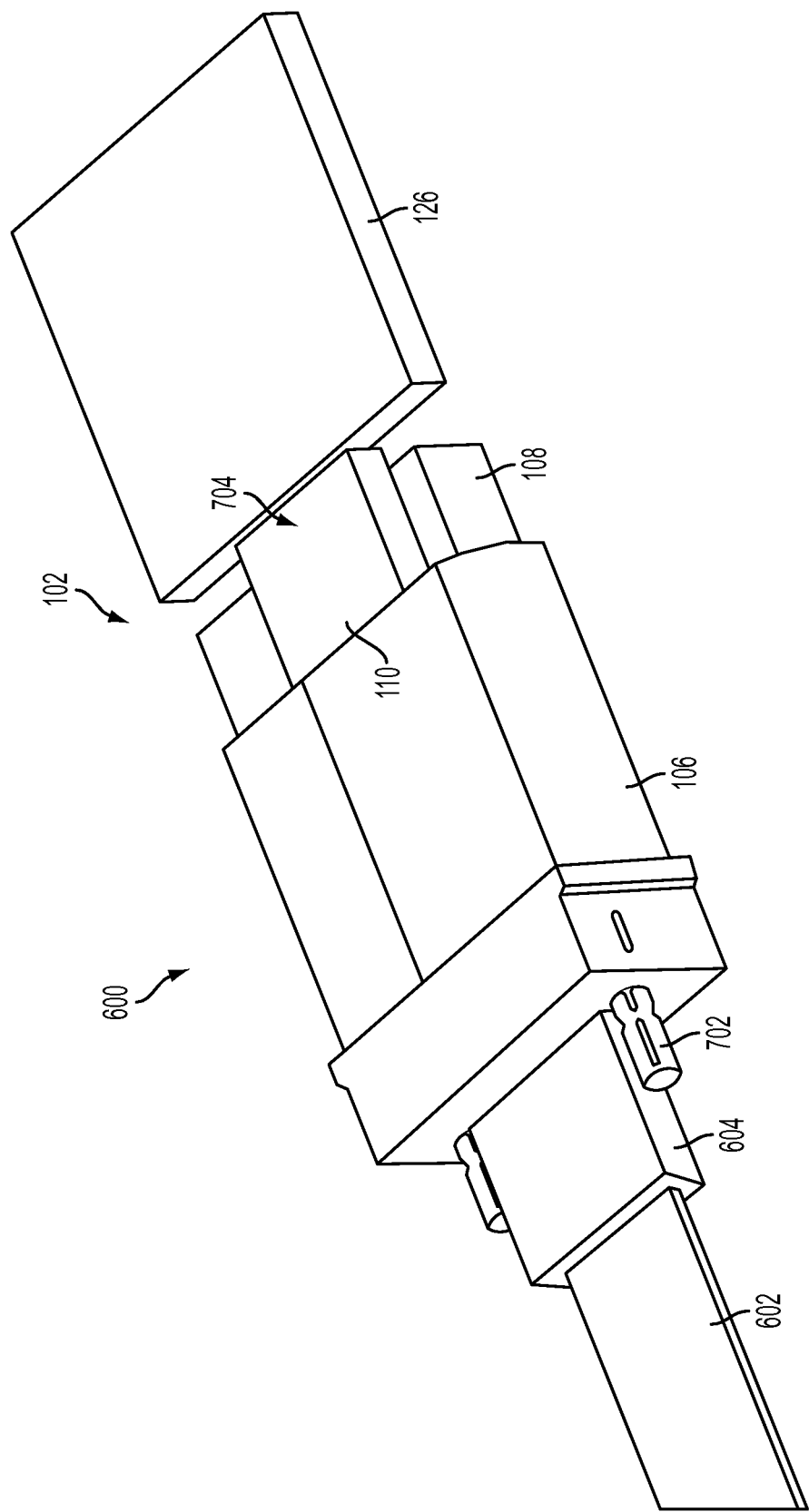
FIG. 7 illustrates a perspective view of the fiber to wafer interface assembly.

FIG. 7 illustrates a perspective view of the fiber to wafer interface assembly 600 where the body portion 108 is partially transparent. In this regard, the illustrated embodiment shows the engagement of alignment pins 702 of the optical fiber ferrule 106 with guide portions 802 (of FIG. 8 described below) that may include, for example, cavities defined by the interface device 102. The alignment pins 702 align the optical fiber (not shown) arranged in the optical fiber ferrule 106 with the waveguide portions (not shown) of the interface device 102, and may secure the optical fiber ferrule 106 to the interface device 102. The cap portion 110 includes an exposed surface 704 that opposes a substantially planar surface of the cap portion 110. The body portion 108 of the illustrated embodiment may include a curved profile similar to the body portion 108 of FIG. 1.

Figure 8:
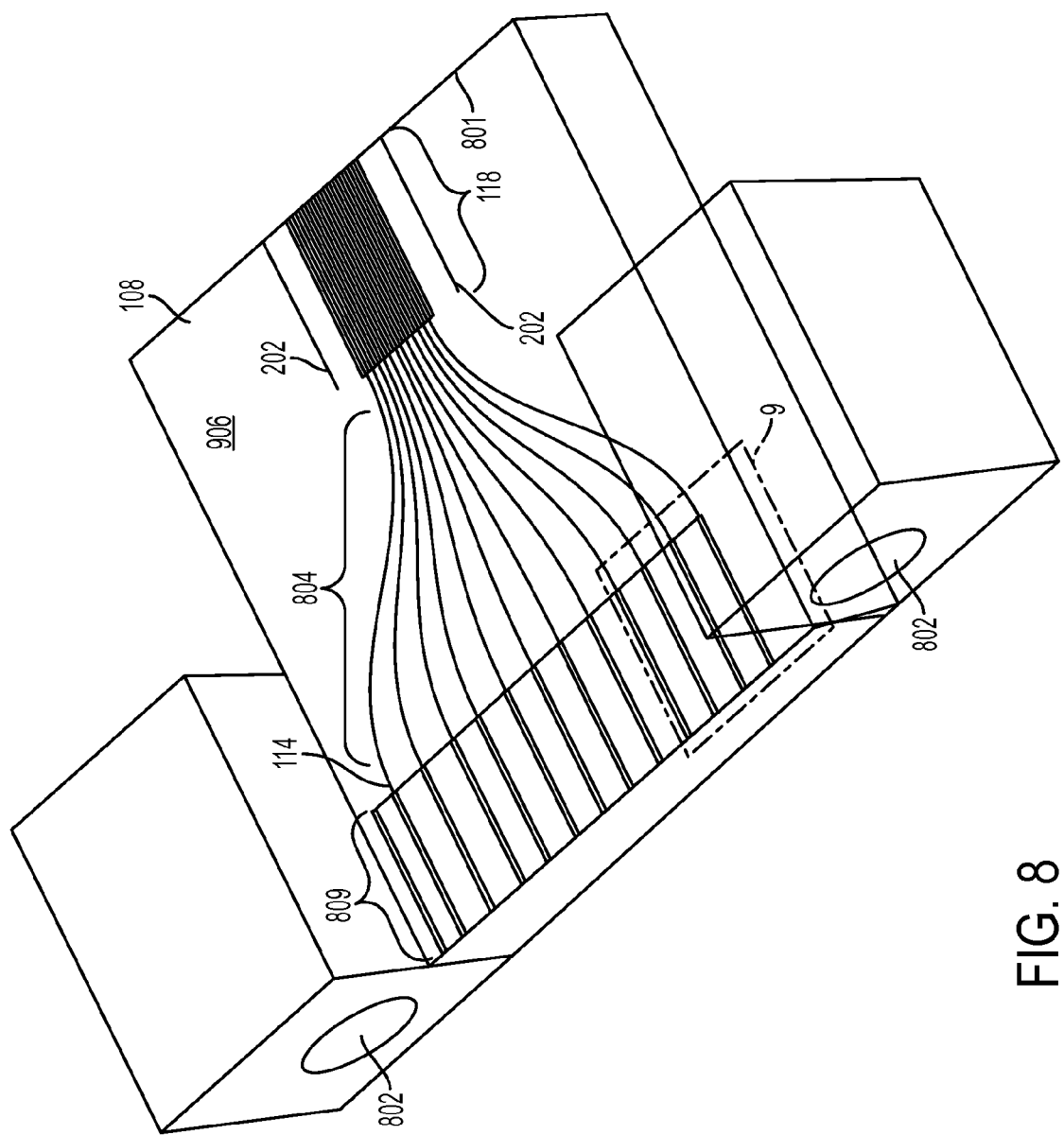
FIG. 8 illustrates a perspective view of an exemplary embodiment of a body portion.

FIG. 8 illustrates a perspective view of an exemplary embodiment of a body portion 108. The body portion 108 includes guide portions 802, and cladding portions 114 that define waveguide portions 112 (as shown in FIG. 1). In the illustrated embodiment, a region 804 changes the pitch of the waveguide portions 112; however, alternate embodiments may include a region 804 that, for example, does not include a change in pitch. The cap portion 110 (of FIG. 7) may be arranged to cover or obscure the first mode optical converter 116 (as shown in FIG. 1) regions and 804 of the body portion 108, while the portion 118 remains unobscured by the cap portion 110. The pitch of the waveguide in region 809 may be different than the pitch in the region 118. The pitch of waveguides in region 809 corresponds to the pitch of waveguides in the ferrule and hence be between 100 and 500 μm, or 250 μm. The pitch near 118 corresponds to the pitch of the waveguides on the wafer in region 132 and may be between 10 and 500 μm, or 50 μm. In one embodiment, the guide portion 802 are disposed in precise relation (within 2 microns or within 1 micron) to the waveguide portions 112 (and the cladding portions 114) on the interface. Correspondingly, the alignment pins on the optical fiber ferrule 106 are disposed in a precise relation to the optical fibers 104 (within 1 micron). Hence, the optical fibers 104 are precisely located relative to the waveguide portion 112 through the alignment pins 702 and the guide portions 802.

Figure 9:
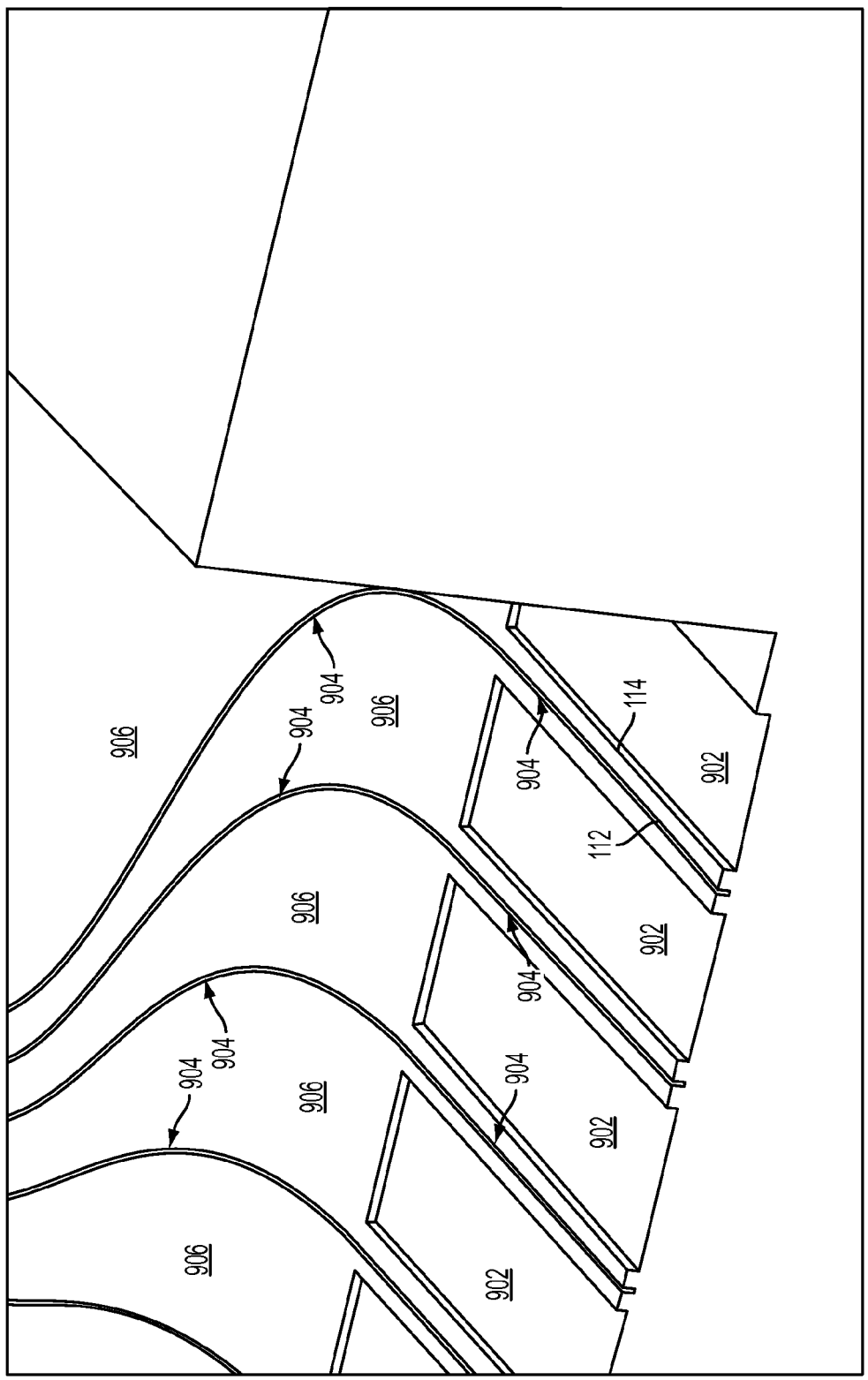
FIG. 9 illustrates an expanded view of the region 9 of FIG. 8.

FIG. 9 illustrates an expanded view of the region 9 (of FIG. 8). In this regard, cavities 902 are arranged in the body portion 108 to provide regions for an overflow of core material in fabrication as described below. An adhesive such as, for example, an epoxy or glue, may be used to secure the cap portion 110 (of FIG. 6) to the body portion 108. The cavities 902 may also provide regions that contain the adhesive. Alternatively, the cap portion 110 may be secured to the body portion 108 using, for example, a suitable bonding or welding process such as, for example, solvent, thermal, ultrasonic, or vibration welding. Channels 902 are defined by the body portion 108 and define three surfaces of the waveguides, while the cap portion 110 when arranged on the body portion 108 defines a fourth surface of the waveguides. In the illustrated embodiment, a planar surface of the cap portion 110 is disposed in contact with the planar surface 906 of the body portion 108.

The interface device 102 may be fabricated using any suitable process. For example, the body portion 108 and/or the cap portion 110 may be fabricated using an injection molding process for thermoplastic or thermosetting plastic materials. A thermoplastic material may include polymer that turns to a liquid when heated and freezes to a glassy state when cooled. The thermoplastic or thermosetting material may have a melting point between 125 and 325 degree Celsius, and adequate melt flow rate (for instance between 1 and 50 $cm^3$/10 min according to ISO 1133).

Figure 10:
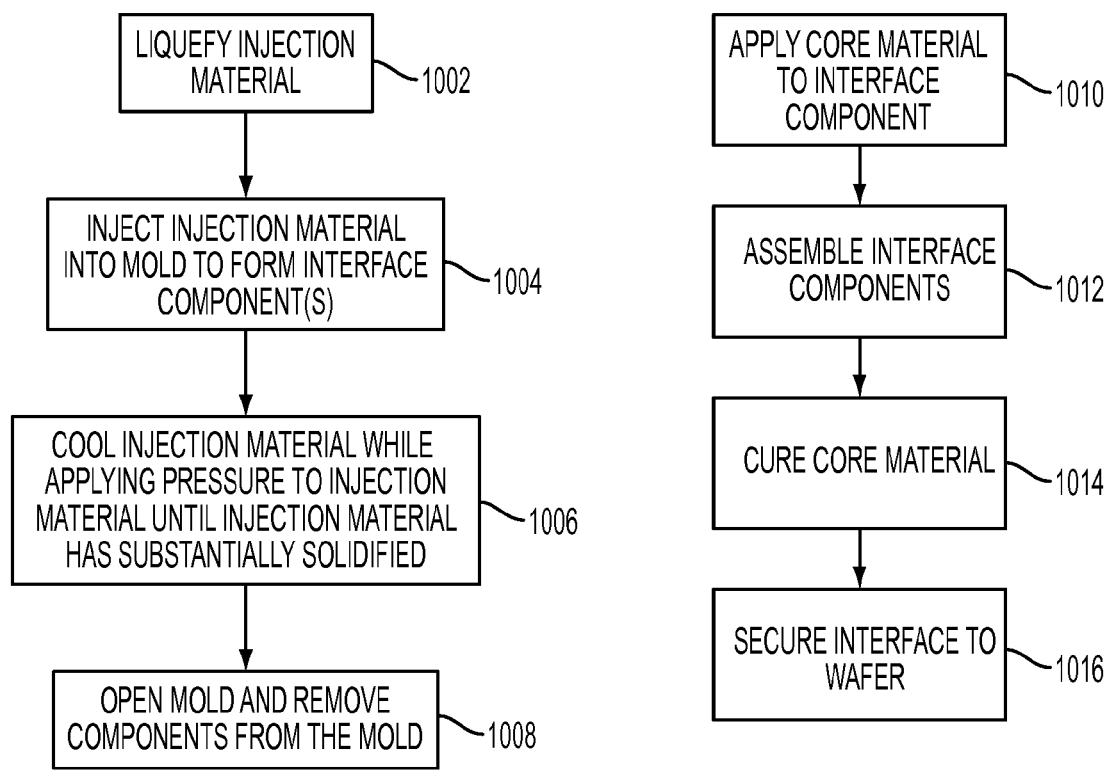
FIG. 10 illustrates a block diagram of an exemplary method for fabricating an interface device.

FIG. 10 illustrates a block diagram of an exemplary method for fabricating an interface device 102 described above. In this regard, a mold may be fabricated having one or more cavities that define body portion(s) 108 and/or the cap portion(s) 110. In block 1002 the injection material is liquefied using, for example, a thermal process. The injection material may include for example, a thermoplastic or thermosetting plastic material such as, for example, Cyclic Olefin copolymer (COC), polycarbonate (PC), polytherimide (PEI), liquid crystal polymer (LCP) polymethyl methacrylate (PMMA), or Polyphenylene sulfide (PPS) having suitable properties to be injected into the mold. In block 1004, the injection material is injected into the mold cavities through an orifice called the mold gate to form interface components (e.g., body portion(s) 108 and/or the cap portion(s) 110). The injection material is cooled while applying pressure to the injection material until the injection material has substantially solidified in block 1006. In block 1008, the mold is opened, and the components may be removed from the mold. Injection molded components often include a gate vestige, which is a remnant of the gate that remains after removing the majority of the gate from a molded part.

Once the body portions 108 have been formed, a core material may be applied to the body portions 108 to form the cores of the waveguides 112 (as described above). In this regard, in block 1010 the core material is applied to the interface component, the core material fills the channels 904 (of FIG. 9), and excess residual core material may be removed from surfaces of the body portions 108 that are outside of the channels 904. The core material may be removed from the surface of the body portion by pressing a flat surface to the body portion 108 prior to applying the UV light. By pressing the flat surface against the body portion 108, the core material will be pressed into the channels and excess material will be displaced into the larger channels. The cap 110 or the body may be produced from an optically clear planar portion that would allow the UV light to transmit through the material. The planar surface may include, for example, a plate that is later removed so the cap portion 110 and the wafer may be applied. Alternatively, the planar surface may include an arrangement of parts, the cap portion 110 may be used on the fiber end and the plate may be used on the wafer end. In block 1012, the interface components may be assembled (e.g., the cap portion 110 is secured to the body portion 108. The core material may be cured in block 1014 by, for example, exposing the core material to a ultraviolet light or another applicable curing process. In block 1016 the interface device 102 is secured to the wafer 126 by applying the adhesive 134 to the interface device 102 and/or the wafer 126, and aligning and securing the interface device 102 to the wafer 126. Alternatively, the cap portion 110 may be formed from polymer that is applied after the core portion is created. In this case, the core material may be applied in liquid form and cured in place. This alternate design may reduce a risk of air gaps forming between the core 112 and the cap 110.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An injection molded interface device, the injection molded interface device comprising:
    a cap portion and a body portion together formed in an injection mold in which the cap portion is of a substantially optically transparent material and disposed on the body portion; and
    the body portion comprising:
        a single-mode waveguide portion including a substantially optically transparent material;
        a cladding portion defined by channels contacting the waveguide portion, the cladding portion including a substantially optically transparent polymer material;
        an engagement feature operative to engage channels in a wafer, the engagement feature comprising sloped walls that extend upward from a planar surface of the body portion such that the sloped walls define angles approximately 20° to 70° relative to the planar surface of the body portion; and
        a guide portion operative to engage a portion of an optical fiber ferrule;
    wherein the body portion comprises single-mode waveguide portions on both a left side and a right side of the sloped walls of the engagement feature.

2. The device of claim 1, wherein the cap portion partially defines the cladding portion; and
    wherein a height of the sloped walls of the engagement feature are configured to fit a depth of the channels in the wafer.

3. The device of claim 1, wherein the guide portion is arranged proximate to a first distal end of the body portion.

4. The device of claim 1, wherein the engagement feature is arranged proximate to a second distal end of the body portion.

5. The device of claim 1, wherein the guide portion includes cavities operative to engage guide pins of the optical fiber ferrule.

6. The device of claim 1, wherein the optical fiber ferrule includes an MT Ferrule.

7. The device of claim 1, wherein the substantially optically transparent material of the single-mode waveguide portion includes a polymer material.

8. The device of claim 1, wherein the single-mode waveguide portion and the cladding portion are arranged on a substantially planar surface of the body portion.

9. The device of claim 1, wherein the body includes of a plurality of waveguides and the pitch of the waveguides varies within the body portion.

10. The device of claim 9, wherein the pitch is larger at an end adjacent to the guide portion than at an opposing distal end.

11. The device of claim 1, wherein the cladding portion is a thermoplastic polymer.

12. A fiber to wafer interface system comprising:
an injection molded interface device comprising:
a polymer material
a single-mode waveguide portion including a substantially optically transparent material;
a cladding portion contacting the waveguide portion, the cladding portion including a substantially optically transparent polymer material;
a guide portion operative to engage a portion of an optical fiber ferrule;
a cap portion and a body portion together formed in an injection mold, wherein the cap portion is disposed on the body portion, the body portion comprising the single-mode waveguide and the guide portion; and
an engagement feature operative to engage channels in the wafer, the engagement feature comprising sloped walls that extend upward from a planar surface of the body portion such that the sloped walls define angles approximately 20° to 70° relative to the planar surface of the body portion, wherein the body portion comprises single-mode waveguide portions on both a left side and a right side of the sloped walls of the engagement feature;
a wafer portion comprising a single mode waveguide portion arranged on a portion of the wafer; and
an adhesive disposed between a portion of the single mode waveguide portion of the body portion and the single mode waveguide portion of the wafer portion, the adhesive securing the body portion to the wafer portion.

13. The system of claim 12, wherein the cladding is partially defined by the cap portion and the body portion.

14. The system of claim 12, wherein the adhesive is substantially optically transparent.

15. The system of claim 12, wherein the single mode waveguide portion of the body portion and the single mode waveguide portion of the wafer portion are arranged to define an optical coupling therein.

16. The system of claim 12, wherein the body portion further comprises an engagement feature operative to engage a corresponding engagement feature of the wafer.

17. The system of claim 16, wherein the engagement feature of the body portion extends from a surface of the body portion, and the engagement feature of the wafer includes a recess portion that engages the engagement feature of the body portion.

18. The system of claim 12, wherein the substantially optically transparent material of the single-mode waveguide portion includes a polymer material.

19. The system of claim 12, wherein the substantially optically transparent polymer material defining the cladding includes a thermoplastic material.

20. The system of claim 12, wherein a pitch between the waveguides of the interface device at one end of the interface device is different than a pitch at an opposing end of the interface device.

21. The system of claim 12, wherein at least one optical fiber is disposed in proximally to a distal end of the interface device.

22. The system of claim 15, wherein at least one optical fiber is disposed in proximity to a distal end of the interface device.

23. The system of claim 22, wherein a number of optical fibers proximate to the interface device corresponds to a number of waveguides arranged on the interface device and a number of single-mode waveguides arranged on the wafer proximate to the interface device.

24. The system of claim 12, wherein the guide portion operative to engage a portion of an optical fiber ferrule includes an MT type ferrule.

25. The system of claim 12, wherein the wafer includes silicon.

* * * * *